United States Patent
You et al.

(10) Patent No.: US 9,414,197 B2
(45) Date of Patent: Aug. 9, 2016

(54) IDENTIFYING PERSONALIZED MEANINGFUL LOCATIONS

(71) Applicant: MOTOROLA MOBILITY LLC, Chicago, IL (US)

(72) Inventors: Di You, Palatine, IL (US); Mir F. Ali, Rolling Meadows, IL (US); Paul C. Davis, Arlington Heights, IL (US); Jianguo Li, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 50 days.

(21) Appl. No.: 14/460,382

(22) Filed: Aug. 15, 2014

(65) Prior Publication Data

US 2016/0050536 A1 Feb. 18, 2016

(51) Int. Cl.
*H04W 64/00* (2009.01)
*H04W 4/02* (2009.01)
*G06F 17/30* (2006.01)
*H04L 29/08* (2006.01)

(52) U.S. Cl.
CPC ......... *H04W 4/025* (2013.01); *G06F 17/30241* (2013.01); *H04L 67/18* (2013.01); *H04W 64/00* (2013.01)

(58) Field of Classification Search
CPC H04W 4/025; H04W 64/00; G06F 17/30241; H04L 67/18
USPC ......... 701/408, 409, 532; 455/456.1; 707/737
See application file for complete search history.

(56) References Cited

U.S. PATENT DOCUMENTS

| | | | |
|---|---|---|---|
| 7,984,006 B2 | 7/2011 | Price | |
| 8,483,711 B1 | 7/2013 | Mendis | |
| 8,527,340 B2 * | 9/2013 | Fisher | G06Q 30/02 455/456.1 |
| 8,612,134 B2 | 12/2013 | Zheng et al. | |
| 2010/0004997 A1 | 1/2010 | Mehta et al. | |
| 2010/0185605 A1 * | 7/2010 | Chu | H04W 4/02 707/722 |

OTHER PUBLICATIONS

Andrey Tietbohl, et al., "A Clustering based Approach for Discovering Interesting Places in Trajectories", Proceedings of the ACM symposium on Applied computing, 2008, pp. 863-868.
Daniel Ashbrook and Thad Starner, "Learning Significant Locations and Predicting User Movement with GPS", Proceedings of the Sixth International Symposium on Wearable Computers, 2002, all pages.

(Continued)

*Primary Examiner* — Russell Frejd
(74) *Attorney, Agent, or Firm* — Shumaker & Sieffert, P.A.

(57) ABSTRACT

A system and method for identifying and labeling locations frequented by a user of a device, where the system and method track geographic positions and environmental or contextual factors as the user moves about, and identify locations of interest to the user via a clustering procedure. As the device collects contextual data, the system and method label each identified location to create a location model. This model allows the device to label new locations as they arise. The model may be periodically updated by separately processing geographic position data gathered after the model was created to determine if the cluster locations and labels remain accurate.

25 Claims, 5 Drawing Sheets

(56) References Cited

OTHER PUBLICATIONS

Changqing Zhou, et al., "Discovering Personal Gazetteers: An Interactive Clustering Approach", Proceedings of the 12th annual ACM international workshop on Geographic information, 2004, all pages.

Andrey Boytsov, et al., "Where Have You Been? Using Location Clustering and Context Awareness to Understand Places of Interest", Proceedings of the 5th International Conference on Internet of Things and Smart Spaces, 2012, all pages.

* cited by examiner

IDENTIFYING PERSONALIZED MEANINGFUL LOCATIONS

TECHNICAL FIELD

The present disclosure is related generally to location identification, and, more particularly, to a system and method for identifying and classifying locations frequented by a user of a mobile communication device.

BACKGROUND

Mobile communication devices can often access both map information and location databases, allowing such devices to guide users to known locations of interest. For example, a user travelling in downtown Chicago may be notified of his proximity to Navy Pier or the Willis Tower, while a user travelling in Agra, Uttar Pradesh, India may be notified that the Taj Mahal is close to his present location. Known locations of interest may include theaters, stadiums, stores, hospitals, museums and so on.

Such systems, however, do not provide assistance or value to a user while the user passes among locations that are not known locations of interest, but rather are locations that are of interest only to a limited number of individuals, perhaps only to the user. The user may program locations and associated labels into a mobile communication device, but this task is one that most users do not undertake, even among those who know how.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

The present disclosure is directed to a system that may eliminate some of the shortcomings noted in the Background section. It should be appreciated, however, that any such benefit is not necessarily a limitation on the scope of the disclosed principles or of the attached claims, except to the extent expressly noted in the claims. Before presenting a detailed discussion of embodiments of the disclosed principles, an overview of certain embodiments is given to aid the reader in approaching the later discussion. As noted above, mobile communication devices are capable of providing guidance to a user regarding known locations of interest. With respect to locations that are of interest only to the user, however, e.g., because they form part of the user's daily routine, such capabilities are of no assistance.

In an embodiment of the disclosed principles, a mobile device is associated with a user and is generally kept with the user as the user goes about his or her daily tasks. The device tracks geographic positions and environmental or contextual factors as the user moves about, and identifies locations of interest to the user via a clustering procedure. Similarly, as the device collects contextual data, it is able to label each identified location as well. In this way, in a further embodiment, the device is able to preemptively modify its behavior such as by modifying its authentication mode, ringer mode, screen mode, networking status and so on as the user enters various locations.

The device may also alert the user to any relevant factors associated with any location. For example, as the user reaches a parking garage after being in his office, the device may generate a traffic report related to the user's general homeward driving route.

Turning now to a more detailed discussion in conjunction with the attached figures, techniques of the present disclosure are illustrated as being implemented in a suitable environment. The following description is based on embodiments of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that many other devices such as but not limited to laptop computers, tablet computers, personal computers, embedded automobile computing systems and so on may also be used.

Figure 1:
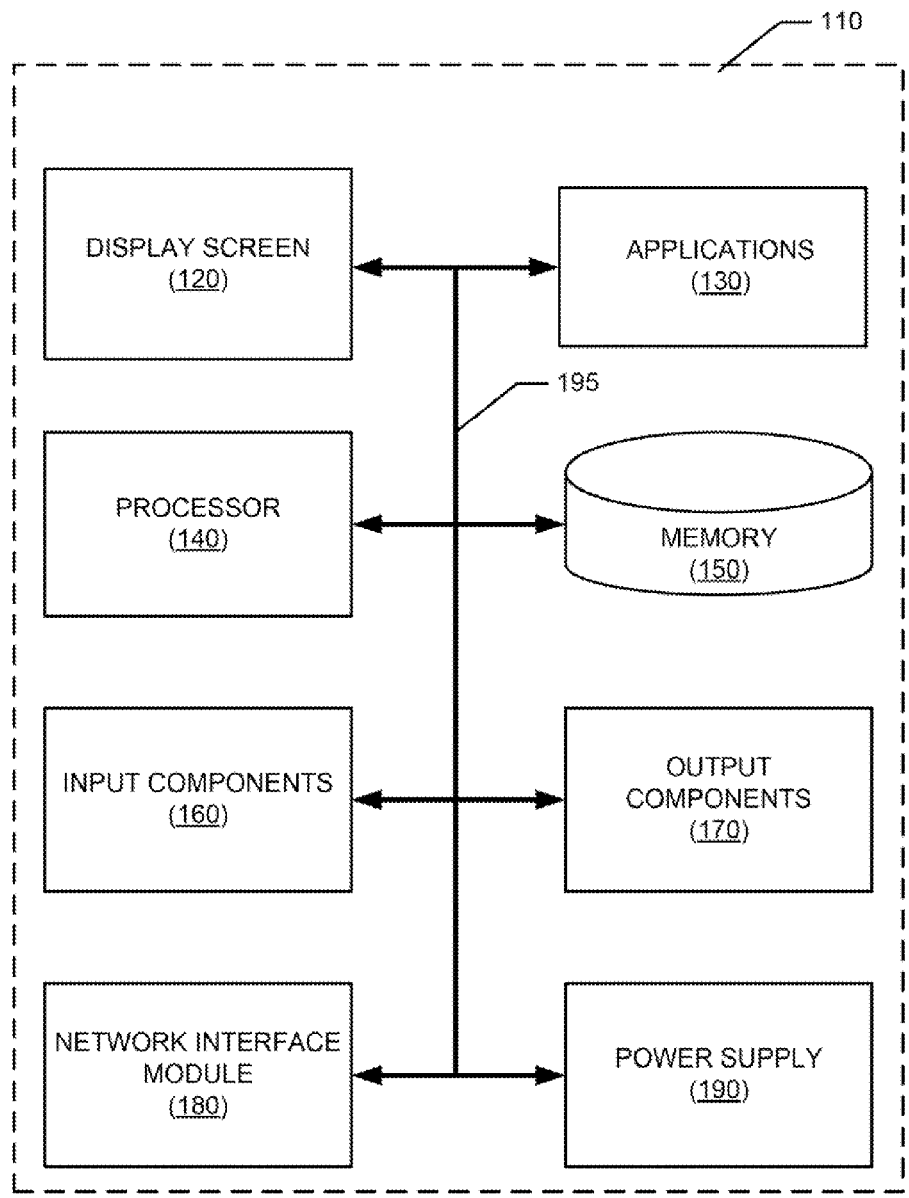
FIG. 1 is a generalized schematic of an example device with respect to which the presently disclosed innovations may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, cost, and other considerations.

In the illustrated embodiment, the components of the user device 110 include a display screen 120, applications 130, a processor 140, a memory 150, one or more input components 160 such as speech and text input facilities, and one or more output components 170 such as text and audible output facilities, e.g., one or more speakers.

The one or more input components 160 of the device 100 also include at least one sensor or system that measures or monitors environmental information associated with a current geographic position of the device 100. The data collected at a geographic position may be referred to herein as a data point. The environmental information may include, for example, ambient light level, ambient noise level, voice detection or differentiation, movement detection and differentiation, and so on. Similarly, the device 100 may also include a sensor configured for determining a geographic position of the device such as a GPS module and associated circuitry and software.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

The illustrated device 110 also includes a network interface module 180 to provide wireless communications to and from the device 110. The network interface module 180 may include multiple communication interfaces, e.g., for cellular, WiFi, broadband and other communications. A power supply 190, such as a battery, is included for providing power to the device 110 and its components. In an embodiment, all or some of the internal components communicate with one another by way of one or more shared or dedicated internal communication links 195, such as an internal bus.

Further with respect to the applications, these typically utilize the operating system to provide more specific functionality, such as file system service and handling of protected and unprotected data stored in the memory 150. Although many applications may govern standard or required functionality of the user device 110, in many cases applications govern optional or specialized functionality, which can be provided, in some cases, by third party vendors unrelated to the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device, or any of a variety of types of information that is uploaded to, downloaded from, or otherwise accessed at servers or other devices with which the device is in communication during its ongoing operation.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various icons that are linked to executable applications).

As noted above in overview, a mobile communication device operating in accordance with an embodiment of the disclosed principles gathers ambient environmental data and user behavior data as the device moves about with the device user. The gathered data is used to generate clusters based on data features, wherein each cluster has a radius associated with a predetermined confidence level. As more data accumulates, the cluster position and radius may be altered and the confidence level may increase. When sufficient data has been accumulated for a given cluster, the device labels the cluster with its discerned purpose, e.g., home, office, gym, etc. The user need not flag locations or manually label any location.

Figure 2:
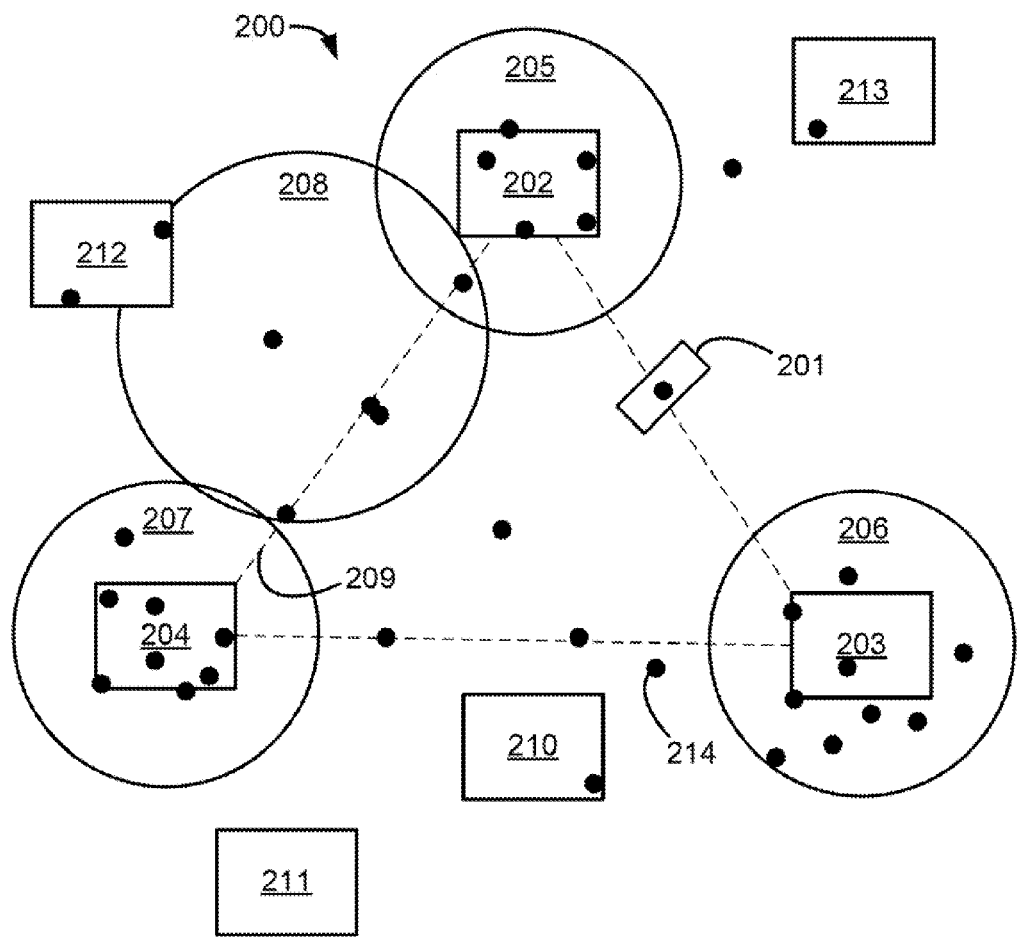
FIG. 2 is a location schematic showing an example device and user environment within which an example of the disclosed principles may be implemented.

A simplified example device usage environment 200 is shown schematically in FIG. 2. As can be seen in the illustrated example, the environment for the user device 201 includes the user's home 202, the user's workplace 203, and the user's gym 204. Each location 202, 203, 204 and some intervening geographic positions also have respective networks associated with them.

Thus, a first WiFi network 205 is associated with the user's home 202, a second WiFi network 206 is associated with the user's workplace 203, and a third WiFi network 207 is associated with the user's gym 204. In the illustrated example, a cellular network 208 is associated with a portion of the user's travel path 209 between the user's home 202 and the user's gym 204. The illustrated environment 200 also includes a number of other geographic positions 210, 211, 212, 213 that the user visits only infrequently if at all.

Each dot signifies a data position 214, which is a geographic position where the device 201 gathered data at some point in time. As can be seen, the data positions tend to group near the locations that the user frequents simply because the user is more often at these locations. The data collected at the data positions 214 may vary depending upon data available at each position. The device attempts to collect environmental and user behavior data that may yield differentiating features. Thus, for example, the device may attempt to collect at each position the device coordinates (latitude/longitude), detected connectivity options (available WiFi networks, Bluetooth connections), device speed, time information (e.g., time of day, day of week, etc.), location variance, ambient light level, ambient sound level and so on.

After a sufficient period of collecting data, e.g., a week or two weeks, the device extracts features from the data to correlate and discriminate between positions. With the extracted features for each data position known, a clustering approach is applied to the set of data positions to generate location clusters based on features. The clustering approach may be any suitable approach, but in an embodiment, a K-means clustering approach, which is known to those of ordinary skill in the art, is applied.

After a number of location clusters have been obtained from the clustering process, labeling criteria are applied to each cluster to automatically label the clusters. Different criteria may be used to identify different clusters. For example, the potential criteria that can be used to identify the user's Home and Work locations may be: the number of points in each cluster, the average proximity between a cluster point to the cluster centroid, the percentage of data points that were collected at night, the percentage of data points that were collected on a weekend, and the percentage of data points for which the phone was in sleep mode.

With respect to cluster labeling, a weight may also be assigned to each criterion. In an embodiment, a score is first calculated from each criterion for each cluster, at which point the overall score of each cluster is obtained by a weighted linear combination of all scores. Then the cluster with the highest score may be labeled as Home, and the cluster with the second highest score may be labeled as Work.

Once the clusters are labeled, the radius of each cluster is calculated in an embodiment so that the radius can be used for further detection of unknown locations. To generate the radius for a given cluster, the distances between cluster points and the cluster centroid are calculated, and the $n^{th}$ percentile is selected to represent the radius of the cluster, where n indicates what portion of the data points are believed to actually belong to the cluster.

The device further generates adaptive confidence levels associated with the location model. These confidence levels may be calculated based on various factors, such as how much data has been collected when the location identification, labeling and radiusing decisions are made, how variant the data points are in one cluster, and so on. These confidence levels improve decision making when the model is operating. For example, if the learned radius of the Home cluster is 100 meters, but the confidence level is only 20%, which is lower than a pre-specified threshold of for example 60%, then the device may decide not to trust the learned radius and may instead use a default radius for Home. This makes the location model more reliable to use.

After the location model is built, it can be used to label any new location data. Thus, given a new data point (associated with a new geographic position), the distance between the new geographic position and the learned location clusters is first calculated; if this distance is smaller than the radius of a known location, then the device assigns the label of this geographic position to the new location. If the new location falls into multiple clusters, then the device assigns the label associated with the smallest distance to the geographic position. If the new geographic position does not fall within the radius of any cluster, then the device may not assign a label to the geographic position.

Figure 3:
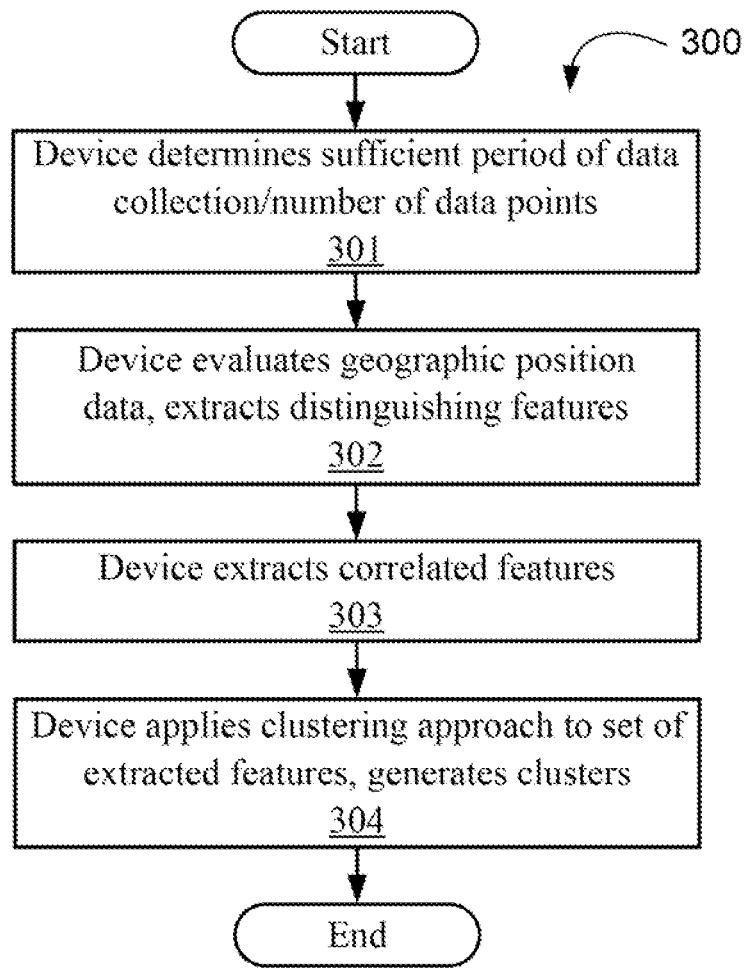
FIG. 3 is a flow chart showing the collection and clustering of geographic position data in accordance with embodiments of the disclosed principles.

With the foregoing in mind, FIG. 3 illustrates a flowchart of the described process 300 for first identifying data point clusters. The flowchart will assume for clarity that the process 300 is executed on the mobile device itself, however, it will be appreciated that the process may be executed partially or wholly on another device such as a server remote from the mobile device.

At stage 301 of the process 300, the device determines that a sufficient period of data collection has been undertaken and that consequently a sufficient number of data points have been sampled. The period of collecting data may be, for example, a week or two weeks. At stages 302-303 of the process 300, the device extracts features from the data to correlate and discriminate between geographic positions.

In particular, at stage 302, the device evaluates all geographic position sample sets to identify and extract features that exhibit a non-even or non-continuously varying distribution. At stage 303, the device optionally extracts additional features that bear a correlation to the identified features for at least a substantial subset of geographic positions, e.g., greater than 25% of locations. For example, if the extracted features include an available network at each geographic position, this feature is a distinguishing or clustering feature across all geographic positions for purposes of stage 302. If another feature correlates to the available network at a given geographic position but not to any other geographic position, this may be a correlated feature for purposes of stage 303.

With the extracted features for each data point known, a clustering approach is applied at stage 304 to the set of extracted features to generate geographic position clusters corresponding to user locations of interest. As noted above, a K-means clustering approach or other suitable clustering process may be used at this stage.

Figure 4:
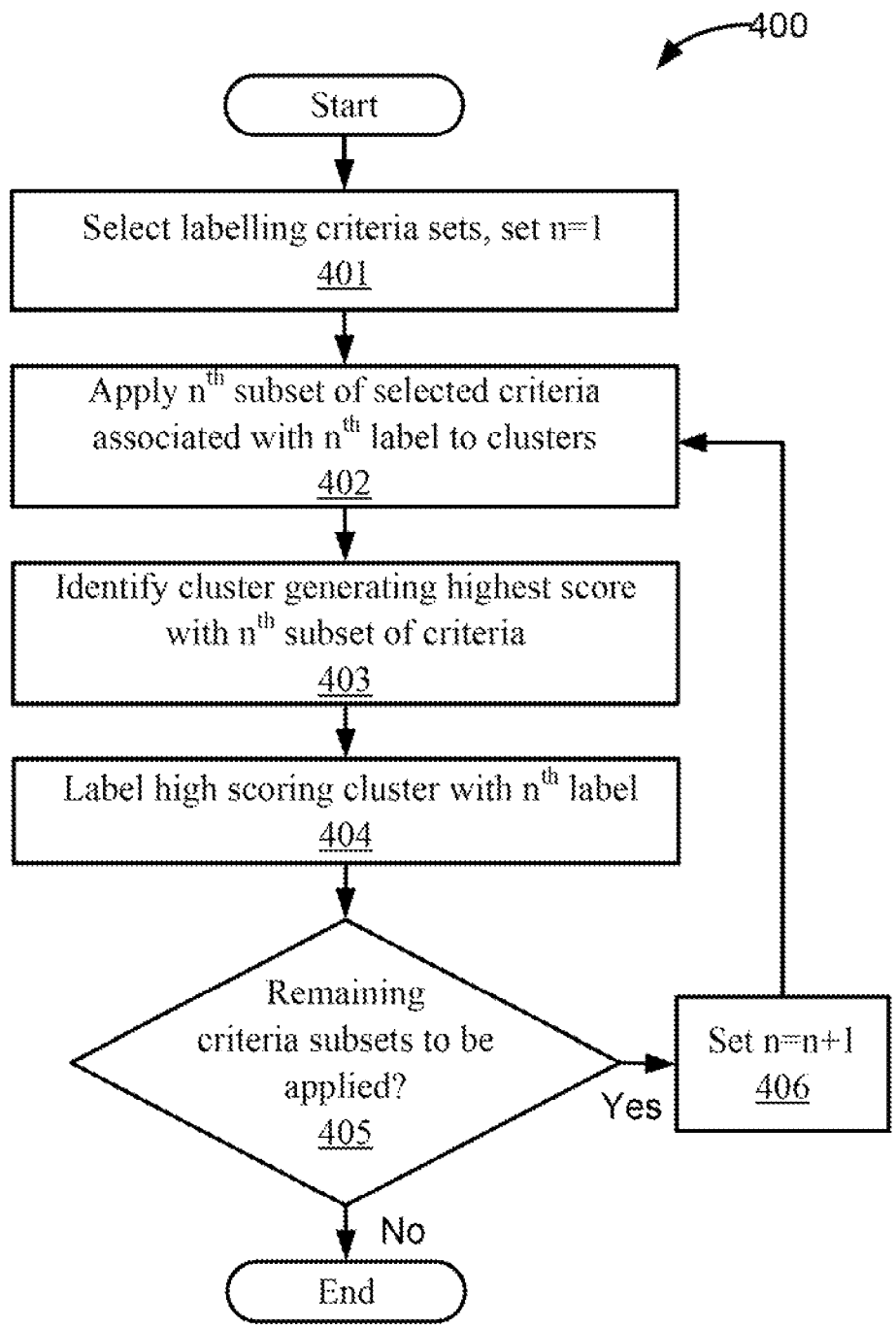
FIG. 4 is a flow chart showing the labeling of identified clusters in accordance with embodiments of the disclosed principles.

Having identified a number of user locations of interest (clusters) through execution of the process 300, the device then labels each identified location of interest. An example labeling process 400 is shown in the flowchart of FIG. 4. In a first stage 401, which may be executed during or substantially prior to the process 400, a number of labeling criteria are selected.

In an embodiment, the criteria, when applied as a set, serve to differentiate between different data points so as to allow labeling of all clusters. However, more typically, different sets of criteria will be associated with different potential user locations of interest. For example, a first set of criteria may be applied to all clusters, and the cluster that scores the highest may be labelled Home, while a second different set of criteria may be applied to identify the user's Work location. The process 400 exemplifies the latter, although it will be appreciated that either type of criteria set may be used.

Thus at stage 402 or the process 400, the device applies a first subset of the selected criteria associated with a first label to the identified clusters, and, at stage 403, identifies the cluster generating the highest score based on the first subset of the selected criteria. At stage 404, the device labels the highest scoring cluster with the first label.

At stage 405, the device checks whether there are other criteria subsets still to be applied. If not, the process 400 ends, whereas otherwise, the process 400 flows to stage 406 to increment the criteria set number and returns to stage 402 to apply the next set of criteria and apply the associated label.

Different criteria may be used to identify different clusters. For example, the potential criteria that can be used to identify the user's Home and Work locations may be: the number of points in each cluster, the average proximity between a cluster point to the cluster centroid, the percentage of points that were collected at night, the percentage of points that were collected on a weekend, and the percentage of points for which the phone was in sleep mode.

With respect to cluster labeling, a weight may also be assigned to each criterion. In an embodiment, a score is first calculated from each criterion for each cluster, at which point the overall score of each cluster is obtained by a weighted linear combination of all scores. Then the cluster with the highest score may be labeled as Home, and the cluster with the second highest score may be labeled as Work.

To complete the location model in an embodiment of the disclosed principles, a radius is assigned to each labelled cluster as noted above, to allow classification of future data locations. In a further embodiment, for a cluster having n geographic positions appearing to belong to the cluster, the $n^{th}$ percentile of the distances between the geographic positions of the cluster and the cluster centroid are used to set the radius of the cluster. It will be appreciated that other methods may be used instead to set each cluster radius.

Figure 5:
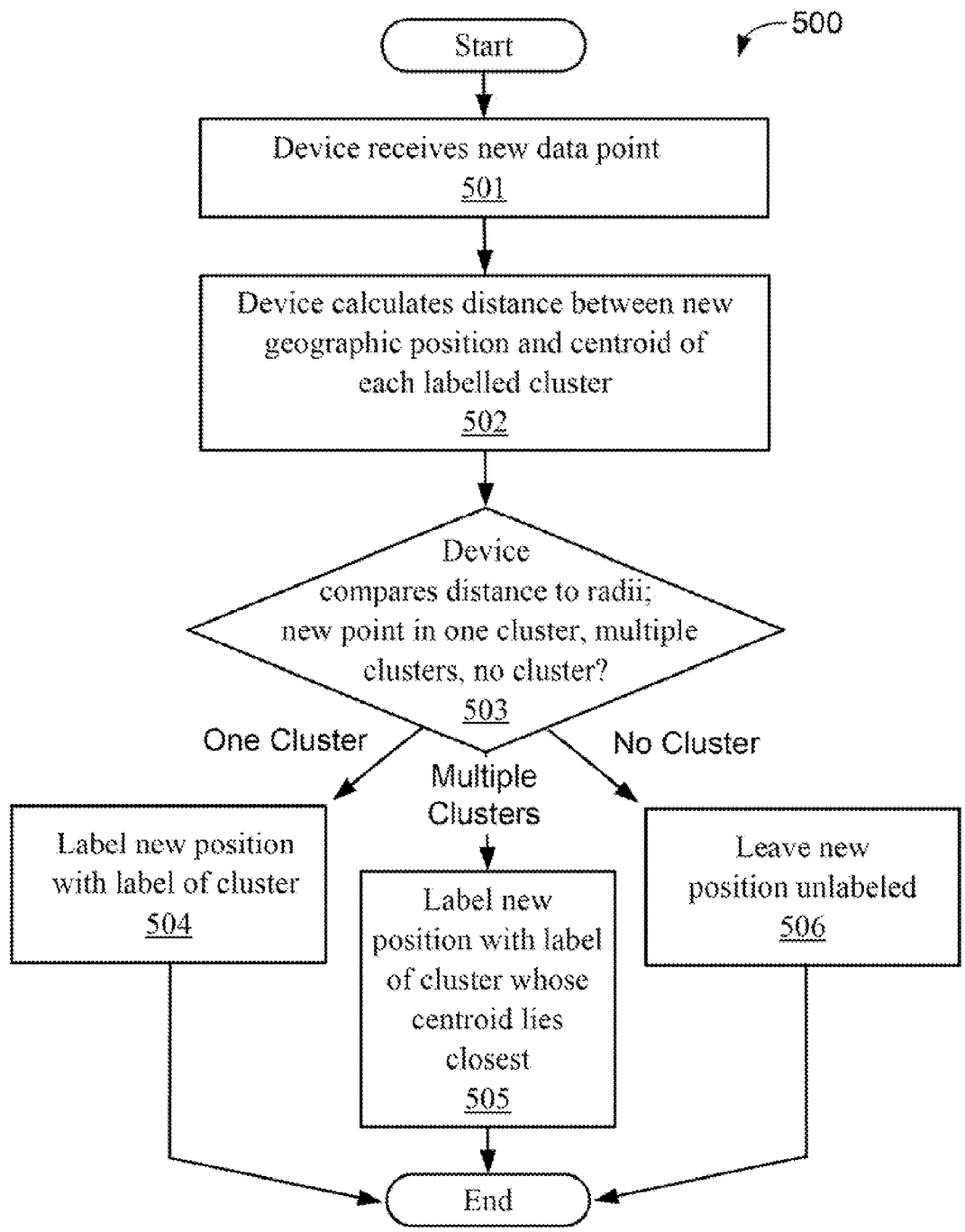
FIG. 5 is a flow chart showing the processing and labeling of new geographic position data according to a location model in accordance with embodiments of the disclosed principles.

Once the location model is built, e.g., as set forth above, the location model may be used to differentiate and label, where appropriate, any new geographic position data. An example process 500 for treating new geographic position data is shown in the flowchart of FIG. 5. New geographic position data is received at stage 501 of the process 500, e.g., when the device periodically makes a data collection according to a schedule or upon sensing a substantial move or new environmental condition.

At stage 502, the distance between the new geographic position and the centroid of each labelled location cluster of the model is calculated. The new geographic position will be either within the radius of one or more location clusters or will be outside of the radii of all location clusters. At stage 503, the device compares the calculated distance against the various cluster radii to determine whether the new geographic position exists within one cluster, multiple clusters, or no cluster.

If it is determined at stage 503 that the new geographic position lies within a single cluster, then the process 500 flows to stage 504, wherein the device labels the new geographic position with the label of that single cluster. If it is determined at stage 503 that the new geographic position lies within multiple clusters, then the process 500 flows to stage 505, wherein the device labels the new geographic position with the label of the cluster to whose centroid the new geographic position lies closest. Finally, if it is determined at stage 503 that the new geographic position does not fall within the radius of any cluster, then the process 500 flows to stage 506, wherein device leaves the new geographic position unlabeled.

As with existing locations, a confidence level can also be obtained for the labeling of a new geographic position. For example, assume a geographic position is predicted as Home with 70% confidence, Work with 20% confidence, and other places with 10% confidence. The confidence can be estimated from how far the new geographic position is to the known locations. It is possible that some of the significant locations for the user will change from time to time. For example, the user may move to a different home or work location.

For this reason, the device periodically updates identified locations of interest to the user. In each update, the location detection approach is performed first for newly collected geographic position data. Then each identified location is compared to the location that is already stored in the system. If the difference between two locations is very small, i.e., within a threshold, that means that this location has not been changed, and the new data point is used to update the old location to make it more accurate; if two locations differ significantly, i.e., by an amount exceeding a threshold, then the old location will be discarded and the new location will be stored in the system for further use. This not only makes the location detection more accurate based on new data points, but also ensures that the system does not miss a significant location change.

It will be appreciated from the foregoing that a system and method for the identification and labeling of user locations of interest has been disclosed. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
    collecting, by a processor of a device, data for each of a plurality of geographic positions to generate a location data set, the data for each of the plurality of geographic positions including one or more features associated with at least one of environmental data and user behavior data collected at the geographic position;
    extracting, by the processor, from the location data set at least one feature that distinguishes the data associated with a first subset of the geographic positions from the data associated with a second distinct subset of the geographic positions;
    clustering, by the processor, the location data set to generate a plurality of distinct clusters of data and associated geographic positions therefrom based on the extracted at least one feature; and
    automatically assigning, by the processor, a respective textual label to each of the plurality of distinct clusters.

2. The method of claim 1, wherein clustering the location data set to generate a plurality of distinct clusters includes defining, by the processor, a radius of each cluster.

3. The method of claim 2 wherein the one or more features include one or more of:
    coordinates of the device, wireless connectivity options detected by the device, a device speed, current time data, device position variance, an ambient light level at the device, or an ambient sound level at the device.

4. The method of claim 3, wherein the wireless connectivity options detected by the device include at least one of a WiFi network, a Bluetooth link, or a cellular link.

5. The method of claim 3, wherein the current time data includes at least one of:
    a time of day, a day of the week, or a date.

6. The method of claim 2, further comprising:
    collecting, by the processor, data at a new geographic position; and
    applying, by the processor, a textual label assigned to an existing cluster to the new geographic position by:
        determining, by the processor, that the new geographic position is within the radius of a cluster; and
        applying, by the processor, the textual label assigned to that cluster to the new geographic position.

7. The method of claim 1, further comprising:
    detecting, by the processor, that the device is within a labeled location, and
    executing, by the processor, an action including one of modifying a device authentication mode, modifying a device ringer mode, modifying a device screen mode, modifying a device networking status, alerting a user, or providing information to the user associated with the location.

8. The method in of claim 6, further comprising:
    defining, by the processor, a confidence level to the textual label applied to the new geographic position.

9. The method of claim 1, wherein clustering the location data set to generate a plurality of distinct clusters comprises:
    applying, by the processor, a K-means clustering methodology based on the extracted features of the location data set.

10. The method of claim 1, wherein automatically assigning the respective textual label to each of the plurality of distinct clusters comprises:
    automatically assigning, by the processor, based on at least a first criterion, a first textual label to a first cluster of the plurality of distinct clusters; and
    automatically assigning, by the processor, based on at least a second criterion, a second textual label to a second cluster of the plurality of distinct clusters,
    wherein the first textual label is different than the second textual label.

11. The method of claim 10, wherein the first criterion is different than the second criterion.

12. The method of claim 10, wherein the first criterion is the same as the second criterion.

13. The method of claim 10, wherein the first criterion or the second criterion includes at least one of:
    a number of data points in each cluster, an average proximity between a cluster point to a cluster centroid, a percentage of data points that were collected at night, a percentage of data points that were collected on a weekend, or a percentage of data points for which the device was in sleep mode.

14. The method of claim 1, wherein the device comprises a mobile communication device.

15. A device comprising:
    a set of sensing elements configured to sense data including one or more environmental conditions and user behaviors at a geographic position of the device; and
    a processor configured to:
        use the set of sensing elements to collect the data for each of a plurality of geographic positions to generate a location data set, the data for each of the plurality of locations geographic positions including one or more features associated with at least one of environmental condition data and user behavior data collected at the geographic position;

extract at least one feature from the location data set to distinguish the data associated with a first subset of the geographic positions from the location data associated with a second distinct subset of the geographic positions;

cluster the location data set to generate a plurality of distinct clusters of data and associated geographic positions and;

automatically assign a respective textual label to each of the plurality of distinct clusters.

16. The device of claim 15, wherein clustering the location data set to generate a plurality of distinct clusters includes defining a radius of each cluster.

17. The device of claim 16, wherein the one or more features include one or more of:

coordinates of the device, wireless connectivity options detected by the device, a device speed, current time data, device position variance, an ambient light level at the device, or an ambient sound level at the device.

18. The device of claim 17, wherein the wireless connectivity options detected by the device include at least one of: a WiFi network, a Bluetooth link, or a cellular link.

19. The device of claim 15, wherein the processor is further configured to:

detect that the device is within a labeled location; and
execute an action including one of:
modifying a device authentication mode, modifying a device ringer mode, modifying a device screen mode, modifying a device networking status, alerting a user, or providing information to the user associated with the location.

20. The device of claim 16, wherein the processor is further configured to:

collect data at a new geographic position; and
apply a textual label assigned to an existing cluster to the new geographic position.

21. The device of claim 20, wherein the processor is further configured to apply a textual label assigned to an existing cluster to the new geographic position by:

determining that the new geographic position is within the radius of a cluster; and
applying the textual label assigned to that cluster to the new geographic position.

22. The device of claim 20, wherein the processor is further configured to assign a confidence level to the textual label applied to the new geographic position.

23. The device of claim 15, wherein the processor is configured to cluster the location data set by applying a K-means clustering methodology based on the extracted features of the location data set.

24. A method comprising:

collecting, by a processor of a device, data via a user mobile communication device data from each of a plurality of geographic positions visited by a user to form a location data set, the data for each geographic position including data linked to the geographic position as well as data related to user behavior at the geographic position;

identifying, by the processor, a plurality of data features across the location data set, each geographic position exhibiting a value for each of the plurality of data features;

clustering, by the processor, the geographic positions represented in the location data set to separate the visited geographic positions into a plurality of distinct clusters; and automatically assigning, by the processor, a respective textual label to each cluster of the plurality of distinct clusters.

25. The method of claim 24, wherein clustering the geographic positions represented in the location data set comprises applying a K-means clustering methodology to the location data set with respect to the plurality of data features.

* * * * *